INVENTORS
Philip R. Laughlin
Earl L. Betts

ATTORNEY

United States Patent Office 3,419,175
Patented Dec. 31, 1968

3,419,175
BAKING PAN FRAME
Philip R. Laughlin, Santa Ana, and Earl L. Betts, Long Beach, Calif., assignors to Banner Metals, Inc., Compton, Calif., a corporation of Ohio
Filed June 26, 1967, Ser. No. 648,714
3 Claims. (Cl. 220—19)

ABSTRACT OF THE DISCLOSURE

A baking pan frame is disclosed herein which is capable of supporting, for example, a plurality of disposable flexible foil-like bread pan sections, which are firmly held in place in the frame when it is clamped down on their rims, and which are protected by the frame. The frame is releasable to permit the pan sections to be removed after they have been used and replaced by other unused pan sections.

Background of the invention

The following steps are usually carried out in a modern bakery for baking bread. First, measured quantities of flour are poured into a hopper which leads into a mixing machine. The flour is mixed in the mixing machine with yeast, shortening and other ingredients, and the resulting mass is kneaded into dough. The dough is then poured into troughs, and the troughs are wheeled into a room in which the temperature is controlled, and in which the dough rises. The risen dough is subsequently cut into pieces and placed in multisection bread pans. The pans containing the dough are placed in racks and wheeled into cabinets. The cabinets also provide a temperature controlled environment, and the loaves continue to rise until ready for baking. The pans of dough are then placed in one end of a long conveyor type oven. The pans move slowly through the oven, and the bread is baked. The baked bread is dumped out of the pans at the other end of the oven, cooled, sliced, and wrapped.

A problem in the baking of bread, for example, in the modern bakery in accordance with the process described above, is that the multisection bread pans presently used constitute a costly and troublesome factor. These bread pans are usually glazed internally so that there will not be excessive sticking of the dough to the pans and so that the baked loaves can be fairly easily dumped out of the pans. However, the pans still have to be cleaned after each use, and also costly reglazing of the pans is frequently necessary.

The present invention overcomes the problem discussed in the preceding paragraph by providing a frame which is capable of firmly supporting and protecting a plurality of disposable flexible pan-shaped sections, formed of suitable metallic foil material. These sections, for example, have the same configuration as the present day multisection bread pan.

The disposable foil pan sections can be easily removed from the frame of the invention after each use and discarded. The discarded pan sections may then be replaced by new pan-shaped foil sections which may be quickly inserted into the frame of the invention and firmly clamped into place.

The use of the frame and the metal foil disposable pan sections of the invention precludes any necessity for cleaning the pans after each use, and also eliminates any need for costly reglazing of the pans. The foil pan sections used in conjunction with the frame may be shaped from readily available and inexpensive metallic foil. The metallic foil may, for example, be aluminum or other suitable material.

Summary of the invention

The invention provides an improved wire-like frame which is constructed to support and protect one or more metallic foil pan sections in side-by-side uniplanar relationship, and which is adjustable readily to release the pan sections when so desired. The frame may be constructed, for example, to be nestable with other like frames for convenient storage when not in use.

Description of the illustrated embodiment

Figure 1:
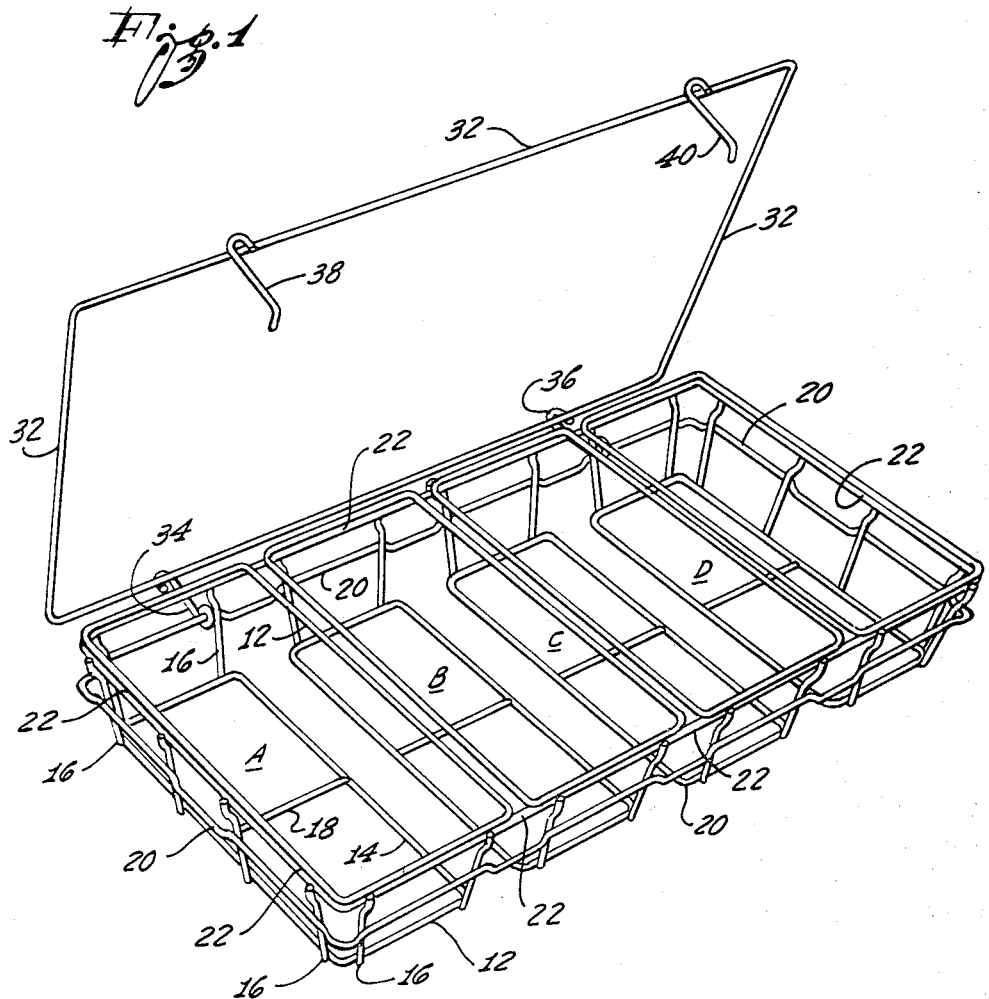
FIGURE 1 is a perspective view of one embodiment of the invention showing a multisection frame for supporting individual flexible metallic foil pan-shaped members, and with a common clamping wire rod member shown in the open position.

As shown in FIGURE 1, for example, the improved wire-formed baking pan frame of the invention, insofar as the illustrated embodiment is concerned, includes a plurality of rectangular sections designated A, B, C, and D, which are disposed in side-by-side uniplanar relationship. Each of the sections may be similarly constructed.

For example, each section may include a first wire rod member, such as the wire rod member 14 of section A. The wire rod member 12 is shaped to enclose a rectangular area and it forms the upper edge of the section A. Likewise, each of the sections may include a second wire rod member, such as the wire rod member 14 of section A. The latter wire rod member also defines, for example, an enclosed rectangular area. The wire rod member 14 is held in a spaced parallel relationship with the wire rod member 12 by means of a plurality of additional wire rod members 16 which are rigidly affixed to the wire rod members 12 and 14 and which extend between the two wire rod members.

The wire rod member 14 constitutes a botttom for the frame section A, for example, and it may be reenforced by a further transverse wire rod 18. As stated above, the sections B, C, and D may be similarly constructed.

A further reenforcing wire rod section 20 extends around the frame between the upper and lower wire rod members of each section. A second wire rod member 22 also extends around the frame directly under the individual wire rod members, such as the wire rod member 12, so as to form a common support therefor; the wire rod members, such as the wire rod member 12, in each instance, being welded to the wire rod member 22. In fact, all the wire rod members of the frame are suitably welded, one to the other, so as to form a rigid unitary structure.

Figure 2:
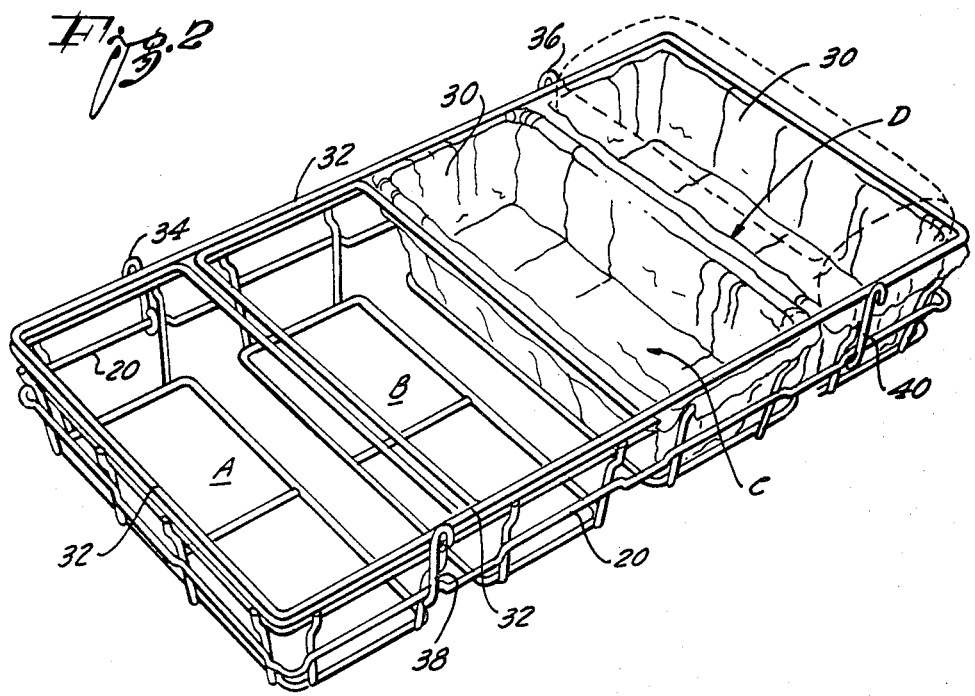
FIGURE 2 is a perspective view of the frame of FIGURE 1, with the wire rod clamping means in a closed position and supoprting, for example, two flexible pan-shaped metallic foil members in the frame.

As shown in FIGURE 2, for example, a pan-shaped metallic foil member 30 may be placed in each of the sections C and D, and like pan-shaped disposable members (not shown) may be placed in the sections A and B. The pan-shaped members have a rectangular configuration in the illustrated embodiment, so as to conform with the configuration of the sections A, B, C and D, and they each have an upper rim which extends outwardly and which may be turned over the upper wire rod member, such as the member 12.

A further wire rod member 32 is formed into a rectangular shaped clamp. This clamp is pivotally mounted on the wire rod member 20 by means, for example, of a pair of hinged members 34 and 36. The clamp 32 may be turned down from the open position of FIGURE 1 to the closed position of FIGURE 2 in which it extends over all the sections and clamps the upper rims of the pan-shaped members 30 down on the corresponding wire rod members, such as the members 12, of FIGURE 1. A pair of latches 38 and 40 are affixed to the clamp 32, and these latches engage the rod 20, and have lower ends which pass down under the rod, so as to hold the clamp 32 firmly in its down position.

It will be appreciated, therefore, that a plurality of the disposable metal foil pan-shaped members can be placed in each of the sections A, B, C and D, when the frame is in the open position of FIGURE 1. Then, the clamp 32 is moved down to its closed position of FIGURE 2, in which the pan, such as the pans 30, are firmly retained in the frame. Also, the upper ends of the pans 30 are opened and exposed, so that the equivalent of the usual prior art multisection bread pan is provided. In addition, the individual flexible pans 30 are protected by the sides and bottom of the frame, so that the overall assembly is capable of withstanding all normal usage to which the multisection bread pans are usually placed.

At the end of the baking operation, the bread is dumped out of the sections, and the clamp 32 again opens and the pans 30 replaced by new and unused pans.

Figure 3:
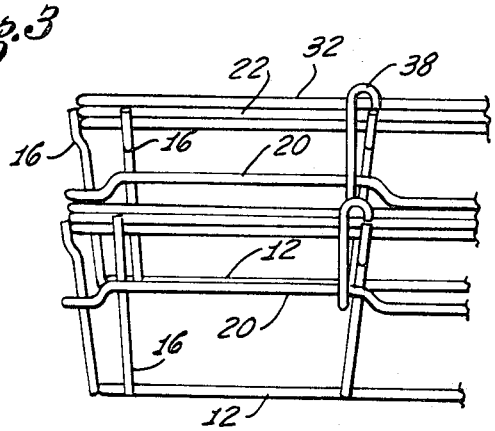
FIGURE 3 is a fragmentary elevation showing the manner in which the wire frame of the invention may be nested with a like frame for convenient storage in a tiered condition, when the frames are not in use.

As shown in FIGURE 3, the sides of the various frame sections may be flared, so that the frame can be nested into other like frames, when not in use, so as to form a convenient tier using a minimum of space.

The invention provides, therefore, an improved frame for use in baking, and which finds particular utility in baking bread. The disposable foil-like pan-shaped members eliminate any need for a cleaning operation, and also obviate the frequently required reglazing operation of the prior art bread pans.

What is claimed is:

1. A wire-formed baking pan frame for supporting a plurality of flexible pan-shaped members, each of said flexible pan-shaped members being formed of metallic foil material and each having an outwardly extending peripheral rim around the upper edge thereof, said frame having a plurality of sections disposed in side-by-side uniplanar mutual relationship, each of said sections including a first wire-rod member enclosing an area for receiving a corresponding one of the pan-shaped members with the peripheral rim of such pan-shaped member extending over said first wire-rod member, a second wire-rod member enclosing an area and essentially spaced from and parallel to said first wire-rod member and forming a bottom for such section, and a plurality of further wire-rod members rigidly affixed to said first and second wire-rod members and extending there-between to maintain said first and second wire-rod members in such spaced and parallel relationship; a clamping wire-rod member enclosing an area corresponding to the overall plan area of said plurality of sections of said frame and serving as a common clamping means for all of said sections; hinge means pivotally mounting said clamping wire-rod member on at least one of the aforesaid wire-rod members of said frame to be turned down on said first wire-rod member of each of said sections of said frame to clamp the rim of the corresponding pan-shaped member thereon; and latching means coupled to at least one of the aforesaid wire-rod members of said frame for releasably holding said clamping wire-rod member in its turned-down position.

2. The wire-formed frame defined in claim 1, in which each of said plurality of sections has a solid rectangular configuration to receive rectangular flexible pan-shaped members of the aforesaid metallic foil material.

3. The wire-formed frame defined in claim 1, in which said sections have flared sides to permit said frame to be tiered with other like frames in a mutually nested relationship.

References Cited

UNITED STATES PATENTS

| 1,262,481 | 4/1918 | Haigh | 220—23.2 |
| 1,840,561 | 1/1932 | Miller | 220—19 X |
| 2,174,425 | 9/1939 | Schlumbohm | 229—3.5 X |

FOREIGN PATENTS

| 1,469,570 | 1/1967 | France. |
| 448,507 | 5/1948 | Canada. |

GEORGE E. LOWRANCE, *Primary Examiner.*

U.S. Cl. X.R.

220—23.2, 85